United States Patent [19]

Ehrhart et al.

[11] 4,385,484
[45] May 31, 1983

[54] PIVOTABLE SHIELDS FOR DISC MOWER-CONDITIONER

[75] Inventors: Philip J. Ehrhart, Narvon; Peter P. Haldeman, Reinholds, both of Pa.

[73] Assignee: Sperry Corporation, New Holland, Pa.

[21] Appl. No.: 294,589

[22] Filed: Aug. 20, 1981

[51] Int. Cl.³ .................. A01D 67/00; A01D 14/00
[52] U.S. Cl. .................... 56/320.1; 56/13.6; 56/192; 56/DIG. 1
[58] Field of Search .............. 56/13.6, 14.2, 14.3, 56/14.4, 14.5, 14.6, 13.5, 156, 157, 189, 190, 192, 208, 220, 320.1, DIG. 1, 105, 106, 119

[56] References Cited

U.S. PATENT DOCUMENTS

| | | | |
|---|---|---|---|
| 2,739,824 | 3/1956 | Kooiker | 56/119 |
| 3,656,284 | 4/1972 | Meek et al. | 56/14.5 |
| 3,672,138 | 6/1972 | Scarnato et al. | 56/158 |
| 3,673,779 | 7/1972 | Scarnato et al. | 56/503 |
| 3,683,602 | 8/1972 | Scarnato et al. | 56/14.4 |
| 3,733,796 | 5/1973 | Wood et al. | 56/220 |
| 3,835,629 | 9/1974 | Rosendahl et al. | 56/14.4 |
| 3,940,910 | 3/1976 | d'Acremont | 56/14.4 |
| 4,094,132 | 6/1978 | Decoene | 56/14.4 |
| 4,174,603 | 10/1979 | Parrish | 56/208 |
| 4,196,567 | 4/1980 | Davis et al. | 56/13.7 |
| 4,227,368 | 10/1980 | Mossman et al. | 56/106 |
| 4,270,338 | 6/1981 | Halls | 56/14.4 |

FOREIGN PATENT DOCUMENTS 2151156  4/1973  Fed. Rep. of Germany .

Primary Examiner—Paul J. Hirsch
Assistant Examiner—Kris R. Schulze
Attorney, Agent, or Firm—Larry W. Miller; Frank A. Seemar; Darrell F. Marquette

[57] ABSTRACT

A crop harvesting machine having a disc cutterbar is disclosed wherein the shields covering each individual disc cutter unit are connected to a transverse rotatable shaft so that the shields can be pivotally moved between a lowered operative position immediately above the disc cutter unit and a raised inoperative position, wherein convenient access can be had to the disc cutterbar for service and maintenance thereof. The shields are connected to the shaft by mounting tabs having a downwardly depending leg that engages a stop on the header frame to prevent the shields from lowering into a position that would interfere with the rotative operation of the disc cutters. A spring-loaded pin and bracket control mechanism is also provided to selectively lock the shields in either the lowered or raised position by controlling the rotative position of the shaft.

16 Claims, 4 Drawing Figures

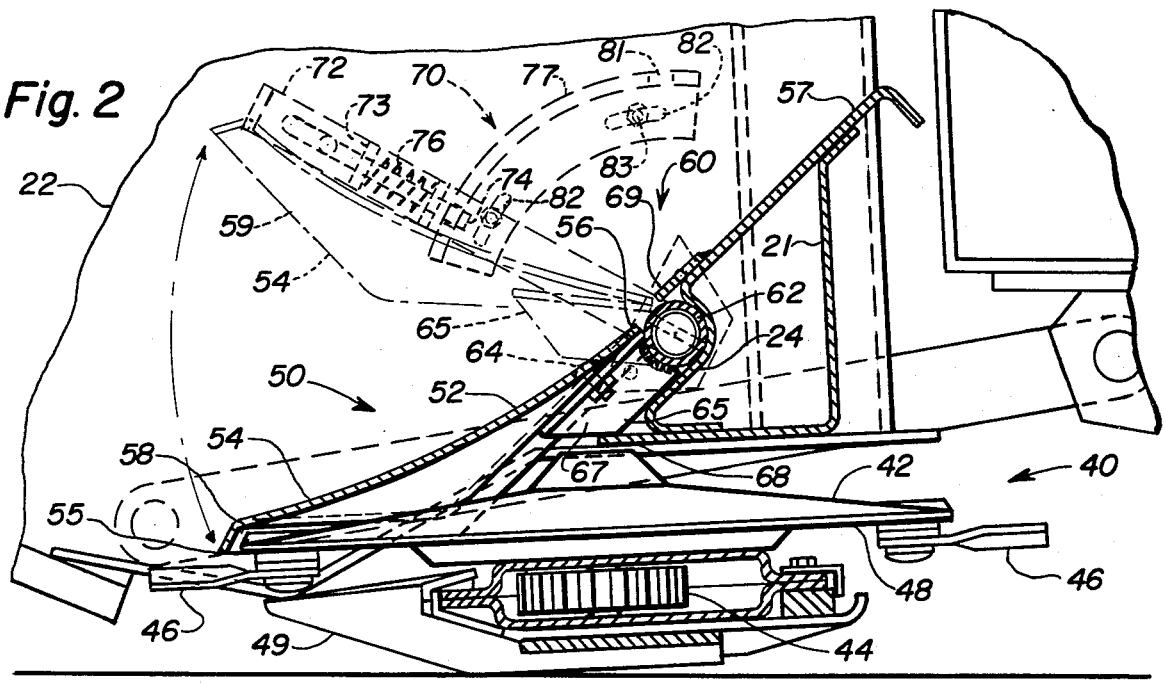
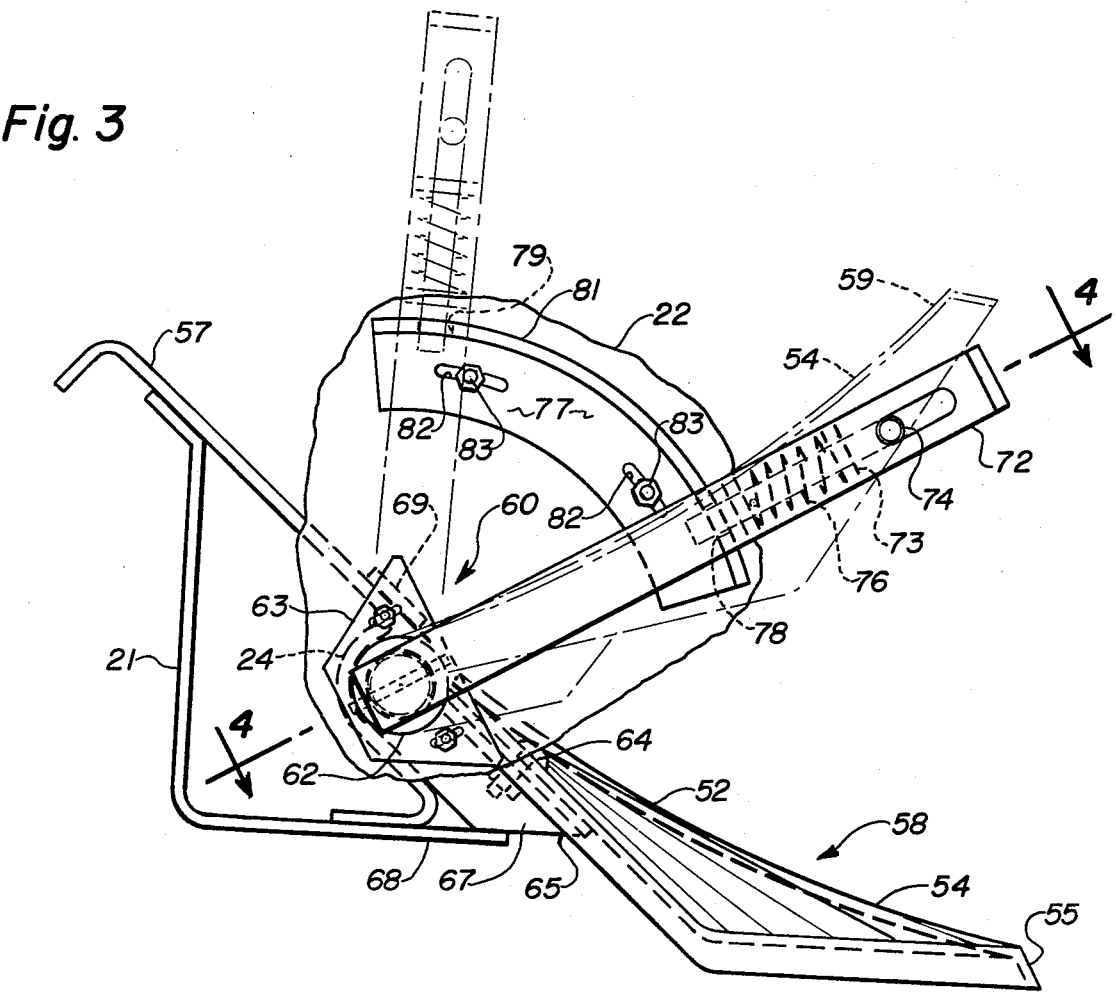

PIVOTABLE SHIELDS FOR DISC MOWER-CONDITIONER

BACKGROUND OF THE INVENTION

The present invention relates generally to crop harvesting machines and, more particularly, to shields covering the disc cutterbar on a disc mower-conditioner.

Disc mower-conditioners can generally be placed into two categories: those using a reel and those not using a reel. Disc mower-conditioners not using a reel utilize the action of the rotating disc cutters to convey severed crop material rearwardly toward the crop conditioner. Some disc mower-conditioners using a reel position the reel rearwardly of the disc cutterbar solely to assist in conveying severed crop material rearwardly, as seen in German Pat. No. 2,151,156, for example. Other disc mower-conditioners position the reel to pick up crop material forward of the disc cutterbar and still convey the severed crop rearwardly.

This latter type of disc mower-conditioner generally includes a shielding mechanism, also referred to as disc covers, over the disc cutters to cooperate with the reel to guide severed crop material rearwardly toward the crop conditioner and to minimize a re-cutting of the severed crop. Examples of these shields can be seen in U.S. Pat. Nos. 3,940,910 and 4,270,338; however, these fixed shields present a problem of gaining access to the individual disc cutter units for service, maintenance and repair thereof. Either the shields have to be unfastened and removed or the operator would have to gain access from the rear of the machine.

SUMMARY OF THE INVENTION

It is an object of this invention to overcome the aforementioned disadvantages of prior art by providing a disc mower-conditioner having shields that are pivotally movable between a lowered operative position and a raised inoperative position.

It is another object of this invention to improve the serviceability aspects for the disc cutterbar on a disc mower-conditioner having shields covering the individual disc cutter units.

It is an advantage of this invention that the serviceability of the disc cutterbar in a disc mower-conditioner having shields covering the individual disc cutter units is comparable with the serviceability of the reciprocating cutterbar on a conventional mower-conditioner.

It is still another object of this invention to provide a limiting device to prevent the pivotally movable shields from lowering beyond the normal operating position and, thereby, interfere with the rotating operation of the disc cutter units.

It is yet another object of this invention to connect the shields to a transverse rotatably mounted shaft so that the individual shield can be simultaneously pivotally moved between a lowered operative position and a raised inoperative position.

It is a feature of this invention that the individual shields are detachably connected to the shaft forming a pivotal axis of movement by mounting tabs affixed to the shaft, so that the shields can be individually removed and replaced.

It is a further object of this invention to provide a position control mechanism cooperable with the shaft forming the pivot axis of the movable shields on a disc mower-conditioner to selectively lock the shields in either the raised or lowered position by controlling the rotative movement of the shaft.

It is a still further object of this invention to provide a disc mower-conditioner which is durable in construction, inexpensive of manufacture, carefree of maintenance, facile in assemblage and simple and effective in use.

These and other objects, features and advantages are accomplished according to the instant invention by providing a crop harvesting machine having a disc cutterbar wherein the shields covering each individual disc cutter unit are connected to a transverse rotatable shaft so that the shields can be pivotally moved between a lowered operative position immediately above the disc cutter units and a raised inoperative position, wherein convenient access can be had to the disc cutters for service and maintenance thereof. The shields are connected to the shaft by mounting tabs having a downwardly depending leg that engages a stop on the header frame to prevent the shields from lowering into a position that will interfere with the rotative operation of the disc cutters. A spring-loaded pin and bracket control mechanism is also provided to selectively lock the shields in either the lowered or raised position by controlling the rotative position of the shaft.

BRIEF DESCRIPTION OF THE DRAWINGS

The advantages of this invention will become apparent upon consideration of the following detailed disclosure of the invention, especially when taken in conjunction with the accompanying drawings wherein:

FIG. 2 is a partial cross-sectional view of the disc mower-conditioner seen in FIG. 1 taken through the disc cutterbar along lines 2—2;

FIG. 3 is a partial end view of the disc mower-conditioner seen in FIG. 1, showing the handle and position control mechanism corresponding to lines 3—3, most of the side sheet being broken away for clarity.

DETAILED DESCRIPTION OF THE PREFERRED EMBODIMENT

Figure 1:
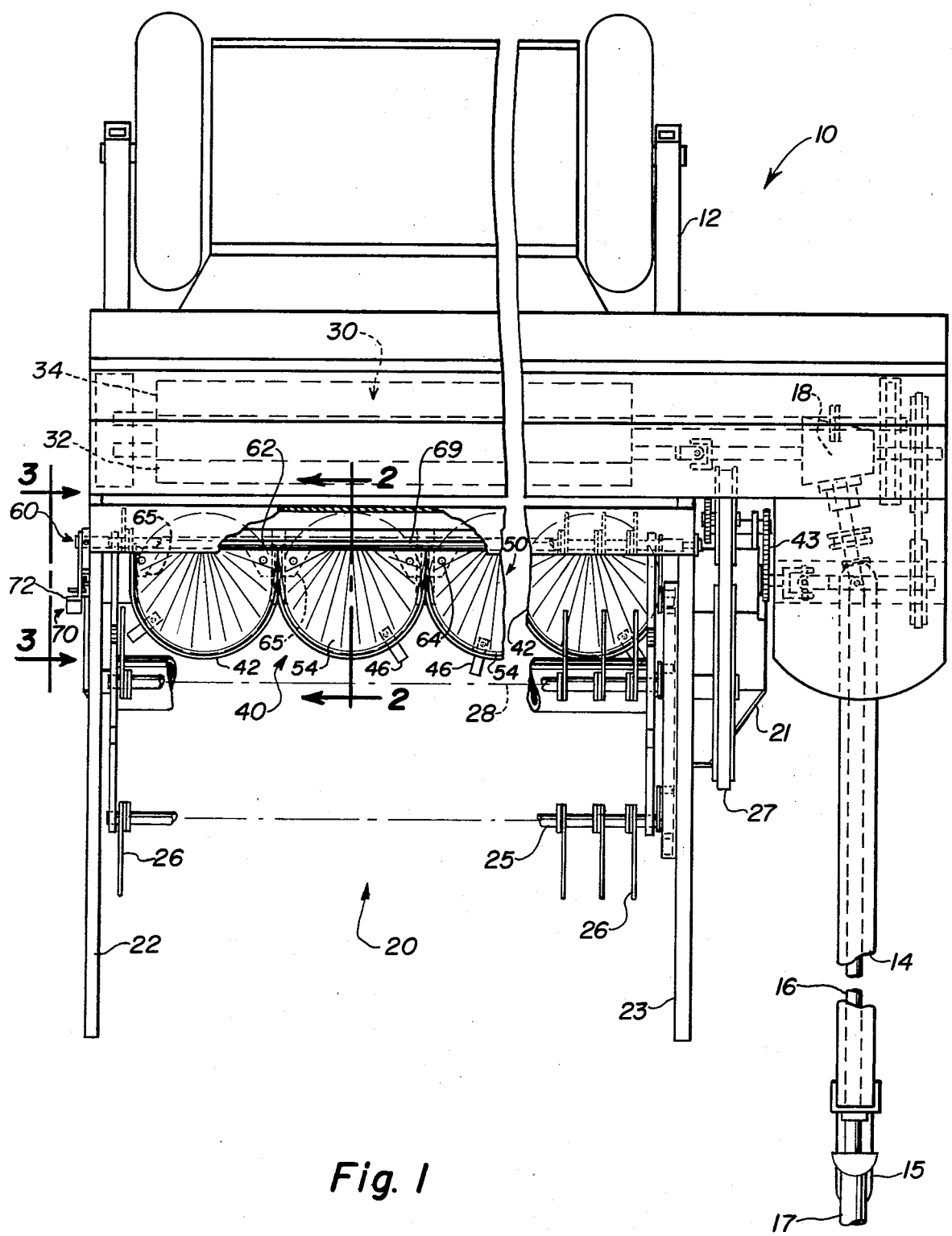
FIG. 1 is a top plan view of a pull-type disc mower-conditioner incorporating the principles of instant invention.
Figure 4:
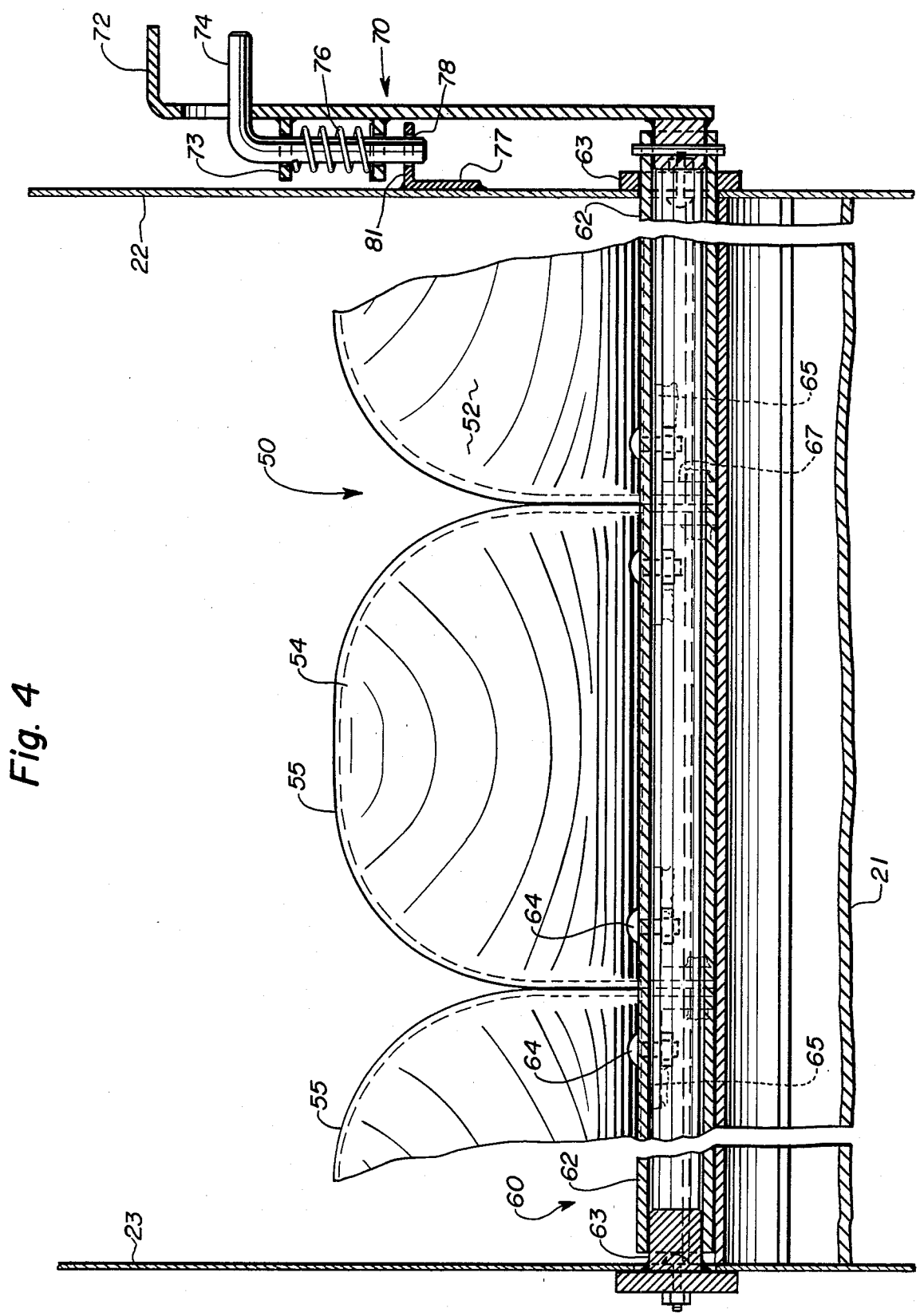
FIG. 4 is a partial cross-sectional view of the disc mower-conditioner seen in FIG. 1 corresponding to lines 4—4 of FIG. 3.

Referring now to the drawings and, particularly, to FIG. 1, a top plan view of the crop harvesting machine, commonly referred to as a disc mower-conditioner, can be seen. Any left and right references are used as a matter of convenience and are determined by standing at the rear of the machine, facing the forward end, the direction of travel. The disc mower-conditioner 10 is generally comprised of a wheeled frame 12 and a crop harvesting header 20 operatively suspended forwardly thereof.

Frame 12 includes a forwardly extending draw bar 14 adapted at the forward end 15 for attachment to a tractor (not shown) for movement across the field to harvest standing crop material. A rotatable drive shaft 16 is housed within the drawbar 14 and is adapted at its forward end 17 for attachment to an external source of rotational power, such as the power take off shaft of the aforementioned tractor. The drive shaft 16 powers a primary drive mechanism, indicated generally at 18, for drivingly powering the various parts of the disc mower-conditioner 10 described below. Further description of the drive mechanism 18 can be found in U.S. Pat. No. 4,127,981 granted to Charles A. Parrish et al on Dec. 5, 1978.

The header 20 is defined by opposing side sheets, or side walls, 22, 23 supported by a header frame 21. The header 20 includes a transversely mounted cutterbar 40 for severing standing crop material from the ground and a reel 25, including a plurality of tines 26, mounted forwardly of the cutterbar 40 for engaging standing crop material and pulling the same rearwardly over the cutterbar 40. The reel 25 is mounted between opposing left and right side sheets 22, 23 about a transverse axis of rotation 28 and is rotatably driven by a reel drive mechanism 27 interconnected with the primary drive mechanism 18.

A crop conditioning mechanism 30 is rotatably supported by the frame 12 rearward of and above the cutterbar 40. As seen in FIG. 1, the crop conditioning mechanism 30 includes an upper conditioning roll 32 positioned above and slightly forward of a lower conditioning roll 34. As is well known in the art, the conditioning rolls 32, 34 can be intermeshing and driven from the primary drive mechanism 18. In general operation, the cutterbar 40 severs standing crop material which is then conveyed rearwardly by the reel 25 to the crop conditioning mechanism 30, such that the severed crop material passes between the upper and lower rolls 32, 34 for conditioning before being deposited on the ground.

As can be seen in FIGS. 1 and 2, the cutterbar 40 is mounted at a lower portion of the header 20, transverse to the line of travel and proximate to the ground for severing standing crop material. The cutterbar 40 includes a plurality of rotatable cutter units 42 positioned in a side-by-side relationship. The primary drive mechanism 18 provides rotational power through the cutterbar drive mechanism 43 which, through internal gearing 44, best seen in FIG. 2, provides rotational power to each individual cutter unit 42, such that adjacent units 42 are rotated in opposite directions.

Referring now to FIGS. 1 and 2, each disc cutter 42 includes a rotating disc member 48 having at least one cutter blade 46 mounted thereon for rotation therewith to sever standing crop material by impact action. Disc member 48 is rotatable with a generally vertically aligned spindle (not shown) which, in turn, is driven by the drive gearing 44 and serves as the axis of rotation of each respective cutter unit 42. Since the internal drive gearing 44 is positioned beneath the disc member 41, this type of cutterbar 40 is commonly referred to as being bottom driven. A further advantage of a bottom driven cutterbar 40 is that a stationary ground engaging skid 49 can be incorporated into each cutter unit 42.

A shielding mechanism 50 forms part of a guide surface 52, concave relative to the reel 22, and is positioned over the cutterbar 40. The shielding mechanism 50 is constructed of a plurality of individual shield members 54, each corresponding to one of the cutter units 42, that can be positioned when in a lowered operating position 58 such that only a portion of the cutter blade 46 extends beyond the forward peripheral edge 55 during rotation of the disc member 48. The forward peripheral edge 55 is semi-circular in shape to correspond to the circular rotative movement of the cutter blade 46.

The rearward-most edge 56 of the shields 54 lies contiguous to a ramp 57 having a surface directed upwardly toward the crop conditioning mechanism 30. The combination of the shield 54 and the ramp 57 forms a substantially continuous guide surface 52 for cooperation with the reel 25 to convey severed crop material rearwardly toward the crop conditioning means 30. As can be seen in FIG. 2, the guide surface 52 has a low profile configuration conducive to the efficient feeding of crop material, particularly "fines" to the crop conditioning mechanism 30. One skilled in the art would readily realize that alternative configurations and positions of the ramp 57 and the shields 54 could still provide a smooth substantially continuously curved guide surface 52 directed toward the crop conditioning means 30.

The shields 54 are mounted to a pivot mechanism 60 to provide movement between the lowered operating position 58 and the raised inoperative position 59. The pivot mechanism 60 includes an elongated shaft 62 rotatably supported between the side sheets 22, 23 by suitable bearings 63. The shields 54 are detachably connected via bolts 64 to mounting tabs 65 affixed to the shaft 62 at intervals along the length thereof corresponding to the width of the shields 54.

As can be best seen in FIGS. 2 and 3, the mounting tabs 65 include a downwardly depending leg 67 which is engageable with a stop 68 formed into the header frame 21 between the side sheets 22, 23 and beneath the shaft 62. The engagement between the leg 67 and the stop 68 prevents the shield 54 from lowering below the lowered operating position 58 and thereby interferring with the rotation of individual cutter units 42. The header frame 21 also includes a curved cradle portion 24 that serves as a transverse support for the shaft 62. A lip 69 affixed to the ramp 57 adjacent the cradle portion 24 of the header frame 21 prevents the shaft 62 from rising upwardly and away from the cradle portion 24.

A position control means 70 is provided to lock the shields 54 in the lowered operating position 58 or the raised inoperative position 59. A handle 72 is affixed to the end of the shaft 62 outboard of the side sheet 22 and is rotatable therewith. A pin 74 is received within a bracket 73 formed as part of the handle 72 and is movable therewith. A second bracket 77 is stationarily affixed to the header side sheet 22 and includes a member 81 positioned perpendicularly to the path of movement of the handle 72 and having two holes 78, 79 therein, corresponding to the lowered operating position 58 and the raised inoperative position 59, respectively, of the shields 54. The holes 78, 79 in member 81 of the bracket 77 are alignable with the pin 74 so that when the pin 74 is inserted in one of the holes 78, 79, the shields are locked in the respective position 58, 59 by reason that the shaft 62 is prevented from further rotative movement. A spring 76 biases the pin 74 toward the bracket 77 to further assure a locking engagement between the pin 74 and the holes 78, 79 of the bracket 77.

The bracket 77 may also include slot-shaped holes 82 through which fasteners 83 extend to attach the bracket 77 to the header sidesheet 22. The provision of the slot-shaped holes 82 permits the bracket 77 to be adjustably positioned relative to the sidesheet 22 to insure that the bracket 77 can be positioned so that the pin 74 is properly received within hole 78 in the member 81 when the shields 54 have been moved to the lowered operating position 58 with the downwardly depending leg 67 engaged with the stop 68.

During operation of the disc mower-conditioner 10, the shields 54 are maintained in the lowered operating position 58 adjacent the individual disc cutter units 42 with the handle 72 being positioned so that the pin 74 is engaged with the hole 78 in the bracket 77. Crop material severed by the rotating cutter blades 46 is conveyed upwardly and rearwardly over the guide surface 52, partly formed by the shields 54, by operation of the reel 25 toward the crop conditioning mechanism 30, whereupon the severed crop is conditioned and deposited upon the ground.

If access to the individual cutter units 42 is desired, such as to sharpen or replace the cutter blades 46, the disc mower-conditioner 10 is stopped and the handle 72 moved into a position wherein the pin 74 is engaged into the hole 79 in the bracket 77. The resultant rotative movement of the shaft 62 pivotally rotates the shields 54 from the lowered operating position 58 to the raised inoperative position 59. One skilled in the art will readily realize that the pin 74 will remain engaged with the hole 78, 79 in the bracket 77 until the pin 74 is manipulated to overcome the force exerted by the spring 76 and thereby permit a repositioning of the handle 72. One skilled in the art would further realize that other holes could be formed in the bracket 77 to provide other lockable positions for the shields 54, if so desired.

It will be understood that changes in the details, material, steps and arrangements of parts which have been described and illustrated to explain the nature of the invention will occur to and may be made by those skilled in the art upon a reading of this disclosure within the principals and scope of the invention. The foregoing description illustrates the preferred embodiment of the invention; however, concepts, as based upon such description, may be employed in other embodiments without departing from the scope of the invention. Accordingly, the following claims are intended to protect the invention broadly, as well as in the specific form shown.

Having thus described the invention, what is claimed is:

1. In a crop harvesting machine having a mobile frame adapted for movement over a field; a transverse cutterbar supported by said frame and having a plurality of rotatable cutter units for severing standing crop material by impact action; rotatable crop conditioning means mounted on said frame rearward of said cutterbar for conditioning severed crop material; crop conveying means mounted on said frame adjacent said cutterbar and said crop conditioning means for conveying severed crop material rearwardly from said cutterbar toward said crop conditioning means; transverse shielding means supported by said frame over said cutterbar to form a guide surface cooperable with said crop conveying means to transfer severed crop toward said crop conditioning means; and drive means for operatively powering said crop conveying means, said crop conditioning means and said cutterbar, the improvement comprising:

pivot means supported on said frame and connected to said transverse shielding means for selectively pivotally rotating said shielding means between a lowered operative position, wherein said shielding means is cooperable with said crop conveying means to guide and transport severed crop material toward said crop conditioning means, and a raised inoperative position, wherein said cutter units are exposed for access thereto from above, said pivot means including an elongated shaft having a first end, a remote second end and an axis of rotation extending therebetween, said first and second ends being rotatably supported on said frame, said shielding means being connected to said shaft and rotatable therewith, said pivot means further including limit means engageable with a stop on said frame for limiting the pivotal movement of said shielding means and preventing said shielding means from being lowered below said operative position to interfere with the rotation of said cutter units.

2. The crop harvesting machine of claim 1 wherein said pivot means further includes a handle affixed to said first end of said elongated shaft for rotating said shaft about said axis of rotation to move said shielding means between said operative and inoperative positions and a position control means cooperatively associated with said handle to secure the position of said handle relative to the frame and, thereby, control the position of said shielding means.

3. The crop harvesting machine of claim 2 wherein said position control means includes a bracket stationarily affixed to said frame adjacent said handle, said bracket having a member extending perpendicular to the path of movement of said handle and having two spaced apart holes therein, said handle carrying a pin alignable with said holes and insertable therethrough to releasably fix the position of said handle relative to said bracket.

4. The crop harvesting machine of claim 3 wherein said pin is spring-loaded to bias said pin toward engagement with said bracket.

5. The crop harvesting machine of claim 4 wherein said bracket has at least two slot-shaped aperatures therein and a fastener corresponding to each said slot-shaped aperature to extend therethrough and adjustably affix said bracket to said frame, such that said bracket can be selectively positioned for proper alignment between said pin and said spaced apart holes.

6. The crop harvesting machine of claim 5 wherein said shielding means comprises a plurality of individual shields corresponding, respectively, to said cutter units, each said shield being detachably connected to a mounting tab affixed to said shaft.

7. The crop harvesting machine of claim 6 wherein at least one of said mounting tabs includes a downwardly depending leg engageable with said stop when said shields are in said operating position to prevent said shields from interfering with the rotating operation of said cutter units.

8. The crop harvesting machine of claim 7 wherein each said cutter unit comprises a bottom driven rotatable disc cutter having at least one cutter blade mounted thereon for rotation therewith to sever said crop material by impact action.

9. A crop harvesting machine comprising:
a mobile frame;
a crop harvesting header suspended forwardly of said frame and having two forwardly extending laterally spaced side walls generally defining the width of said header perpendicular to a forward direction of travel;
a cutterbar mounted in said header between said side walls for severing crop material from the ground, said cutterbar including a plurality of rotatable disc cutter units, each said cutter unit including at least one cutter blade for severing said crop material by impact action;
crop conditioning means rotatably supported by said frame rearward of said cutterbar for conditioning severed crop material;
shielding means extending between said side walls above said cutterbar to form a guide surface to direct severed crop material toward said crop conditioning means, said shielding means including a pivot means for selectively pivotally positioning said shielding means between a lowered operative position and a raised inoperative position, said at least one cutter blade on each of said disc cutter units projecting forwardly beyond said shielding means during rotation of said disc cutters when said shielding means is in said operative position, said shielding means further including a plurality of individual shields corresponding, respectively, to said cutter units, said individual shields being connected to said pivot means such that all of said shields can be pivotally moved from said operative position to said inoperative position simultaneously; and drive means for operatively powering said disc cutter units and said crop conditioning means.

10. The crop harvesting machine of claim 9 further comprising a crop conveying means supported by said header adjacent said cutterbar for cooperatively associating with said guide surface to convey severed crop material rearwardly toward said crop conditioning means.

11. The crop harvesting machine of claim 10 wherein each said shield includes a concave top surface relative to said crop conveying means to form at least a part of said guide surface.

12. The crop harvesting machine of claim 11 wherein said pivot means includes an elongated shaft having first and second ends rotatably supported in said header side walls, respectively, said shaft further having a plurality of mounting tabs affixed thereto and extending generally perpendicularly therefrom, said shields being detachably connected to said mounting tabs so as to be rotatable therewith, rotation of said shaft causing said shields to pivotally move between said operative and inoperative positions.

13. The crop harvesting machine of claim 12 wherein at least one of said mounting tabs includes a downwardly depending leg engageable with a stop affixed to said header to limit the downward movement of said shields so that said shields cannot move lower than said operative position to interfere with the rotative movement of said disc cutter units.

14. The crop harvesting machine of claim 13 wherein said pivot means further includes a handle affixed to said shaft adjacent to one of said side walls and a position control means cooperatively associated with said handle for selectively controlling the rotative position of said shaft.

15. The crop harvesting machine of claim 14 wherein said position control means includes a bracket stationarily affixed to said one of said side walls adjacent said handle and a springloaded pin mounted on said handle to be biased toward engagement with said bracket, said bracket having a member projecting perpendicularly from said side wall for engagement with said pin, said member having at least two holes therein alignable with said pin to selectively lock said shaft in one of two rotated positions corresponding to said operative and inoperative positions of said shields.

16. The crop harvesting machine of claim 15 wherein said bracket has two slot-shaped aperatures therein and two fasteners positioned through said aperatures for engagement with said one of said side walls to selectively adjustably affix said bracket to said one of said side walls so that said holes in said bracket can be properly aligned with said pin.

* * * * *